(12) United States Patent
Alvanas et al.

(10) Patent No.: US 11,467,297 B1
(45) Date of Patent: Oct. 11, 2022

(54) MULTIMODE HYDROPHONE ARRAY

(71) Applicant: The United States of America as represented by the Secretary of the Navy, Newport, RI (US)

(72) Inventors: Elizabeth A Alvanas, Portsmouth, RI (US); Harold T Vincent, II, North Kingstown, RI (US)

(73) Assignee: The United States of America as represented by the Secretary of the Navy

( * ) Notice: Subject to any disclaimer, the term of this patent is extended or adjusted under 35 U.S.C. 154(b) by 399 days.

(21) Appl. No.: 16/868,567

(22) Filed: May 7, 2020

(51) Int. Cl.
*G01V 1/18* (2006.01)
*G01V 1/16* (2006.01)
*G01V 1/52* (2006.01)
*G01V 1/38* (2006.01)

(52) U.S. Cl.
CPC .............. *G01V 1/187* (2013.01); *G01V 1/164* (2013.01); *G01V 1/52* (2013.01); *G01V 1/3861* (2013.01); *G01V 2001/526* (2013.01)

(58) Field of Classification Search
CPC .......... G01V 1/187; G01V 1/164; G01V 1/52; G01V 1/3861; G01V 2001/526
See application file for complete search history.

(56) References Cited

U.S. PATENT DOCUMENTS

| 4,970,046 A | * | 11/1990 | Dolengowski | ....... G01V 1/3861 367/173 |
| 5,018,116 A | * | 5/1991 | Congdon | .............. B06B 1/0611 310/334 |
| 5,051,966 A | * | 9/1991 | Gjestrum | ............... G01V 1/006 367/173 |

\* cited by examiner

*Primary Examiner* — Daniel Pihulic

(74) *Attorney, Agent, or Firm* — James M. Kasischke; Michael P. Stanley

(57) ABSTRACT

An acoustic array has a frame and multimode transducers positioned along the frame. The multimode transducers are cylindrical and divided into circumferential transducer segments. The transducer segments each have a common ground electrode and an electrode associated with the segment. An elastomeric bushing is between each multimode transducer and the frame. Electrical leads are joined to the electrodes. A proximate plug is provided at one end of the frame, and a distal plug is provided at the other. A connector is positioned in the proximate plug and joined to the electrical leads. An elastomeric hose surrounds the frame and is sealed to the proximate plug and the distal plug. The interior volume is filled with a dielectric fluid.

12 Claims, 3 Drawing Sheets

MULTIMODE HYDROPHONE ARRAY

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is directed to an array of multimode hydrophones, and more particularly to an array of multimode hydrophones that is tailored for detection of underwater locator beacons.

(2) Description of the Prior Art

The U.S Navy utilizes a towed pinger locator system known as the TPL-25 for locating underwater locator beacons (ULB). These ULBs are positioned on flight data recorders and are activated after aircraft downing. The TPL-25 is a kite-shaped fiberglass shell that is towed behind a surface vessel while its single omnidirectional hydrophone listens for the acoustic signal being transmitted from the ULB.

Recovery of a downed aircraft's flight recorders is critical to an accident investigation because the information they provide is essential to determining the cause of the accident. The TPL-25, however, has had mixed success in locating downed aircraft. It was successful in locating the Adam Air Flight 574, which crashed on Jan. 1, 2007 while flying over the Makassar Strait, killing all 102 people on board. The U.S. Navy found it at a depth of between 4,900 and 6,200 feet using a TPL-25 on the USNS Mary Sears. More recently, on Dec. 29, 2017, a U.S. Navy team using the TPL-25 discovered the wreckage of a C-2A Greyhound aircraft that crashed into the Philippine Sea on Nov. 22, 2017 while en route to the USS Ronald Reagan. The wreckage was discovered at a depth of 18,500 feet. The TPL-25 was unsuccessful in its search for Malaysia Airlines Flight 370 which disappeared Mar. 8, 2014 with 239 people on a route from Kuala Lumpur in Malaysia to Beijing, China.

The window in which to locate the flight recorders is short. The typical battery on a flight recorder's ULB begins to fade after 35 days and loses meaningful output after 38 to 40 days. With a large search area and a limited window of opportunity, detection range becomes critical to success. The higher the detection range, the higher the probability of locating the ULB.

Using the below assumptions and equations from Urick, *Principles of Underwater Sound* (1983), the detection range of the TPL-25 is calculated to be 2840 yards or 2597 meters. The ULB is assumed to have a beacon center frequency of 37.5 kHz and a source level (SL) of 160 dB re 1 µPa @ 1 m. The signal duration (t) is 0.01 seconds. The ULB is ambient noise limited. Assumed sea conditions are sea state 3, salinity 35 ppt, pH of 8, and water temperature of 4° C. An ideal volume noise model is used with an ambient noise level (NL) of 35 dB re 1 µPa/Hz and an absorption coefficient at zero depth ($\alpha_0$) of 8 dB/kyd. Regarding the TPL-25 system, desired probability of detection p(D) is 0.5 (50% probability of detection) with a desired probability of false alarm p(FA) of 0.0001 (1 chance in $10^4$ of a false alarm occurring in the signal duration.) The system has a detection index of 16. (This is used in calculating detection threshold (DT)). Integration time (T) is 0.5 seconds. Assumed search depth (SD) is 9,843 feet. (This is used in calculating the absorption coefficient $\alpha$).

U.S. Pat. No. 9,829,565 to Crocker, entitled "Underwater Acoustic Beacon Location System," discloses a method which utilizes a linear acoustic sensor array to provide a precise estimate for the location of a ULB using data collected during a single, non-maneuvering pass of a typical search pattern. This technology claims to increase the detection range of the current TPL-25 system by 37% (from 3.5 kilometers to 4.8 kilometers). Conventional beamforming technology is used to estimate the position of the ULB and to resolve the left-right directional ambiguity. The method does not resolve the forward-aft directional ambiguity. Furthermore, the method requires that the array be oriented orthogonal to the direction of the motion, a restriction that might adversely affect the hydrodynamics of the towed body.

Due to the limited operating life of the ULB there is a need for a device that provides an increased detection range.

SUMMARY OF THE INVENTION

It is a first object to provide a sonar sensor.

Another object is to provide a sonar sensor that is capable of operating at undersea depths.

Yet another object is to provide a sonar sensor specifically designed to detect underwater locator beacons at enhanced ranges.

Accordingly, there is provided an acoustic array having a frame and multimode transducers positioned along the frame. The multimode transducers are thin cylinders of radially poled piezoelectric material with four internal electrodes, each covering a segment of the cylinder, and a continuous external electrode. The four inner electrodes allow for a different voltage to be applied to each of the four transducer segments. The continuous external electrode serves as a common ground for each of the four internal electrodes. An elastomeric bushing is between each multimode transducer and the frame to acoustically isolate the transducer from the frame. Electrical leads are joined to the electrodes. A proximate plug is provided at one end of the frame, and a distal plug is provided at the other. A connector is positioned in the proximate plug and joined to the electrical leads. An elastomeric hose surrounds the frame and is sealed to the proximate plug and the distal plug. The interior volume is filled with a dielectric fluid.

BRIEF DESCRIPTION OF THE DRAWINGS

Reference is made to the accompanying drawings in which are shown an illustrative embodiment of the invention, wherein corresponding reference characters indicate corresponding parts, and wherein.

DETAILED DESCRIPTION OF THE INVENTION

Multimode transducer technology is a technology that exploits the fundamental vibration modes of a transducer in order to create a particular directional transmit or receive pattern. A typical multimode vibration pattern is a cardioid. A cardioid has a null or point of no displacement, and on the opposite side, it has a point of maximum displacement that corresponds to the cardioid's main response axis.

A cardioid pattern is created through the combination of the first two extensional modes of vibration of a cylinder, the omnidirectional (n=0) mode and the dipole (n=1) mode. The omnidirectional mode of the cylinder corresponds to a breathing mode in which the cylinder radius expands and contracts, all parts of the cylinder moving inward or outward at the same rate. The dipole mode of the cylinder is a bending mode in which the entire cylinder oscillates back and forth, all parts of the cylinder moving in the same direction at the same time.

Figure 1:
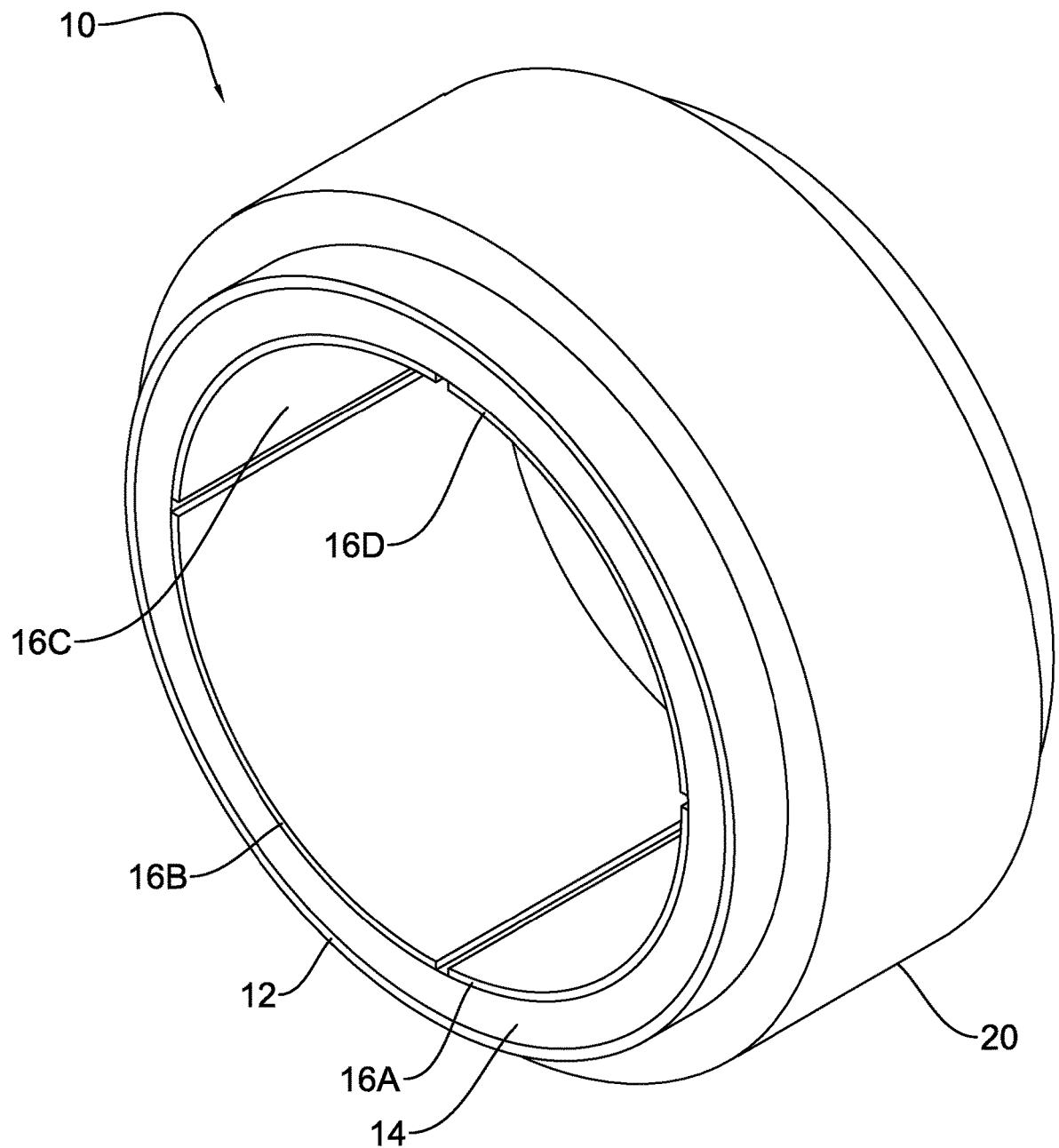
FIG. 1 is a view of a single transducer element of the current sensor.

FIG. 1 shows a multimode transducer 10 that can be used in one embodiment. Transducer 10 is cylindrical in shape and has an outer electrode 12 as the outer surface of the transducer 10. Transducer 10 is made from one active portion 14 positioned inside and in contact with outer electrode 12. The active portion is preferably made from a piezoelectric material such as lead zirconate titanate (PZT). The active portion 14 has four separate inner electrodes 16A, 16B, 16C, and 16D positioned on its inner surface. Inner electrodes 16A, 16B, 16C, and 16D define an interior surface of transducer 10. Inner electrodes 16A, 16B, 16C, and 16D electrically divide the active portion into four segments, and allow independent measurement of each segment. While transducer 10 shows four segments 16A, 16B, 16C, and 16D, other types of transducers can have different numbers of segments. An elastomeric bushing 20 is positioned on the outer surface of transducer 10, outside of outer electrode 12. Bushing 20 allows for mounting transducer 10 on a structure, and serves as a vibration isolator.

Transducer 10 can be electrically connected to measure vibrations in mode 0 and in mode 1. To measure mode 0, the voltage is measured between the outer electrode 12 and the combined inner electrodes 16A, 16B, 16C, and 16D. Mode 1 can be measured by measuring the combined output of two adjacent inner electrodes, 16A and 16B for example, against the combined output of the opposite two inner electrodes, 16C and 16D. A different response pattern orientation can be achieved by using inner electrodes 16B and 16C against inner electrodes 16D and 16A.

Four segment, multimode transducer 10 can be the striped cylindrical transducer manufactured by Steiner & Martins, Inc. (STEMiNC), as part number SMC2622T13111SP. This transducer has an outside diameter of 26 mm, inside diameter of 22 mm and length of 13 mm. This transducer is radially poled. It is made of lead zirconate titanate (PZT), and is specified by Steiner & Martins, Inc. (2018) to be a modified Navy Type I or PZT-4. This transducer has a fundamental resonance frequency of 42 kHz.

When a multimode transducer 10 is used as a receiver, the transducer 10 vibrates in some combination of its omnidirectional mode and its higher modes of vibration. The vibration results in a voltage across each electrode, which is proportional to the deformation of the corresponding segment. These voltage signals can be processed in a manner that will generate a cardioid receive beam pattern. This process is described below for the transducer described in the current embodiment.

First, an omnidirectional receive pattern is created by summing the voltage signals across the combined inner electrodes 16A, 16B, 16C, and 16D. A dipole receive pattern is created by summing the voltage signals of two adjacent inner electrodes, summing the voltage signals of the opposite two inner electrodes, and then subtracting one sum from the other. A cardioid beam pattern is created by a weighted sum of the omnidirectional and dipole receive patterns. The null of the cardioid is the angle where acoustic waves cancel each other out by destructive interference.

Figure 2:
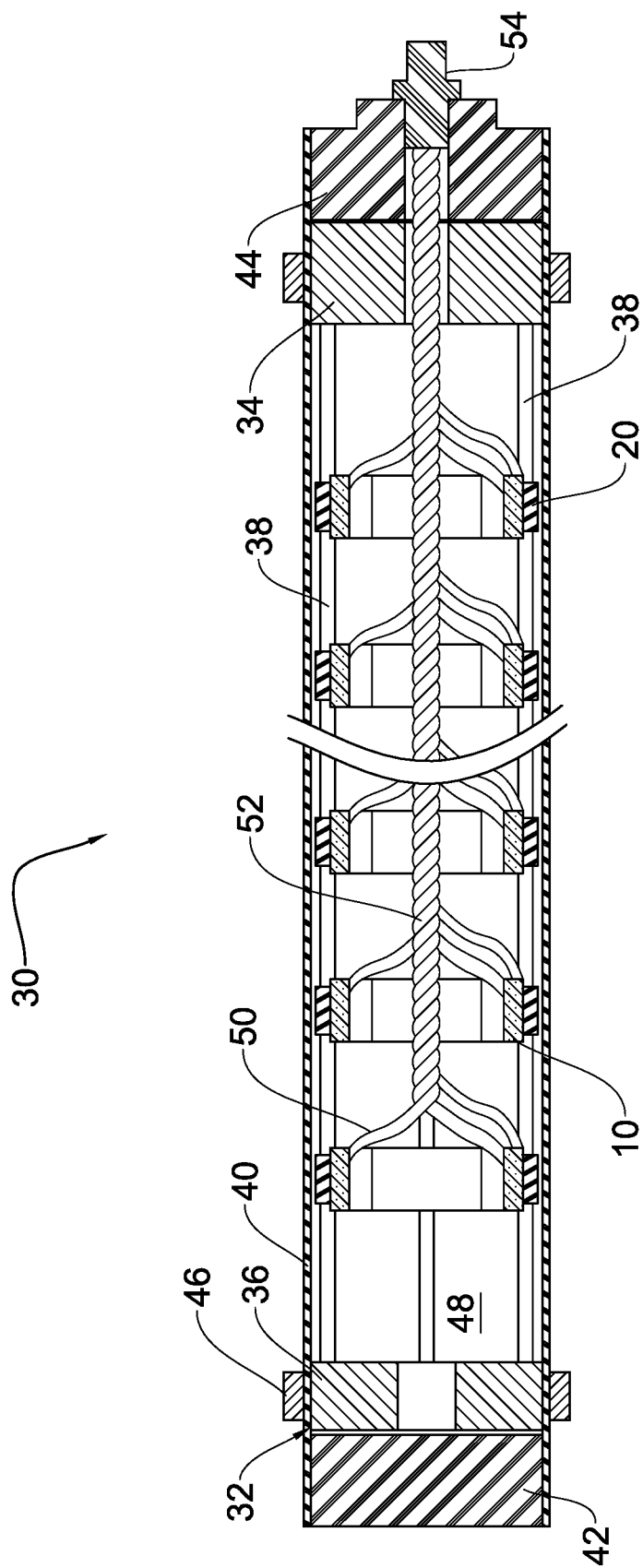
FIG. 2 is a cross-sectional view of a sensor array embodiment.
Figure 3:
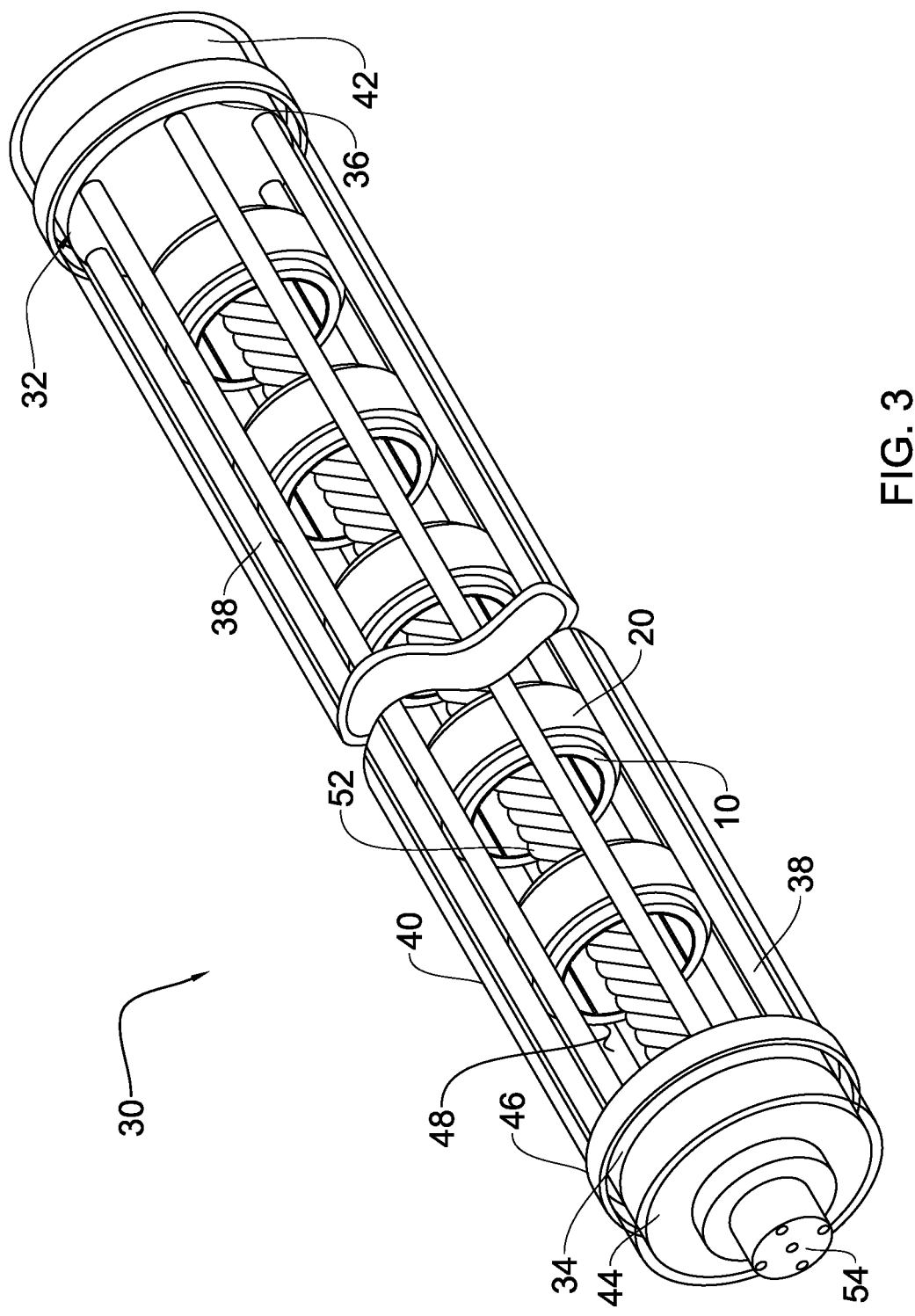
FIG. 3 is an isometric view of a sensor array embodiment.

FIG. 2 shows a cross-sectional view of an array embodiment 30 of multimode transducers 10. FIG. 3 shows an isometric view of array 30. The views are not to scale and are broken in the center to allow more details to be shown. Like reference numbers are utilized to identify like items in FIG. 2 and FIG. 3. In one embodiment, elastomeric bushing 20 is utilized to mount transducers 10 to a cylindrical frame 32. Cylindrical frame 32 has a rigid proximate cap 34, a rigid distal cap 36, and a plurality of frame rods 38 joined to proximate cap 34 and distal cap 36. Other embodiments can use different frame constructions. The primary purpose of frame 32 is maintaining transducer 10 spacing and rigidity when array 30 is subjected to external pressures. Frame 32 is sealed against the environment by an elastomeric hose 40 that surrounds proximate cap 34, distal cap 36, and rods 38. Hose 40 has an inside diameter of 1.5" and outside diameter of 1.875". Hose 40 is sealingly mounted on the exterior of a distal plug 42. Hose 40 extends along frame 32 and is further mounted on and sealed to the exterior of a proximate plug 44. Compression bands or hose clamps 46 can be provided on the exterior of hose 40 to compress hose 40 against proximate plug 44 and distal plug 42. Distal plug 42 and proximate plug 44 are preferably made from a resilient material such as polyoxymethylene, also known as Delrin, or the like. Hose 40 is preferably made of a material such as polyurethane that is acoustically transparent. Hose 40 can also be visibly transparent to permit observation of the interior of array 30. Volume 48 within hose 40 and plugs 42 and 44 is filled with a dielectric fluid such as Isopar or castor oil, mainly for the purpose of matching the acoustic impedance of the ambient seawater. Oil in volume 48, hose 40, and plugs 42 and 44 provide a watertight construction that will allow deep submergence of array 30.

Electrodes (see FIG. 1) on transducers 10 are electrically joined to a wiring connection 50. Wiring connections 50 can be separate wires or can be bundled into a wiring harness 52. In one embodiment, wiring harness 52 can be positioned in the center of array 30. Wiring harness 52 is joined to a connector 54 sealingly positioned in proximate plug 44. In one embodiment, array 30 can be wired such that transducer segments having the same orientation are wired together in parallel. Connector 54 can be a 5 pin connector in this embodiment. This is an efficient arrangement that supports simplified signal processing.

In another embodiment, each transducer segment can be individually wired so that each segment of each transducer can provide a signal. Connector 54 should be capable of transmitting all of these signals. This embodiment provides for flexible signal processing that can include beamforming.

In a prototype, fifteen multimode transducers were used in order to optimize efficiency for locating a ULB. Corresponding segments of each transducer were wired in parallel to minimize wiring complexity. The multimode transducers were Steiner & Martins, Inc. (2018) modified Navy Type I or PZT-4 striped cylindrical transducers, part number SMC2622T13111SP. For the purpose of locating a ULB, the operating frequency, f, is 37.5 kHz. The sound speed, c, is estimated as 1500 m/s. Wavelength, λ=c/f, is 4.0 cm. Number of transducers n is 15, and each transducer has a length L of 1.3 cm. Utilizing these parameters and equations from Urick 1983, optimal spacing between the transducers can be determined. In this case, optimal spacing is the spacing that generates the highest Directivity Index (DI). It was determined that 7/8 wavelength (3.5 cm) spacing between transducers (center-to-center) generates the highest Directivity Index (DI), a 2-dimensional horizontal DI of 15.8 dB.

In this embodiment, frame 32 includes six stainless steel rods, 24 inches in length and 1/8 inch in diameter, arranged in parallel. Rods 38 are joined to proximate cap 34 and distal cap 36 made from brass. Elastomeric bushings 20 are made from rubber and used to isolate transducers 10 from the stainless steel rods 38. The fifteen transducers are positioned in the frame 32 according to the pre-determined spacing, and wired with four signal wires (one wire per corresponding transducer segment) and one ground wire. Signal wires 50 are soldered to 5-pin connector 54. This assembly is housed in a elastomeric hose 40 and free-flooded (oil filled) 36 for deep submergence. Delrin plugs 42 and 44 are used at each end of the elastomeric hose 40, and hose clamps 46 are used to form an impermeable seal.

The beam pattern for a linear array of multimode cylinders, using the Product Theorem (Urick, 1983), is the product of 1) a cardioid, 2) a non-directional (unstriped) cylinder, and 3) an array of 15 point sensors. Computational analysis was used to calculate the theoretical beam pattern, Directivity Index (DI), and detection range of this invention. The beam pattern equation is shown below.

$$b(\phi, \theta) = \left[\frac{1+\cos\phi\sin\theta}{2}\right]^2 \left[\frac{\sin[(\pi L/\lambda)\sin\phi]}{(\pi L/\lambda)\sin\phi} \cdot \sin\theta\right]^2 \left[\frac{1}{N}\sum_{n=0}^{N-1} e^{jnkd\cos\phi\sin\theta}\right]^2 \quad (1)$$

When this beam pattern is plugged into the below equation for a 3-dimensional Directivity Index (DI), the theoretical 3-dimensional DI of this invention is calculated to be 18.35 dB.

$$DI = 10\log\frac{\int_{4\pi} d\Omega}{\int_{4\pi} b(\phi, \theta) d\Omega} = 10\log\frac{4\pi}{\int_0^{2\pi}\int_{-\pi/2}^{\pi/2} b(\phi, \theta)\cos\phi d\phi d\theta} \quad (2)$$

To calculate the predicted detection range of the TPL-25 system if its omnidirectional hydrophone were replaced by the embodiment described above (herein referred to as the improved TPL-25 system), the same equations that were used to calculate the detection range of the current TPL-25 system are used again, but a Directivity Index (DI) of 18.35 dB is substituted for the omnidirectional hydrophone's DI of 0 dB. When this is done, the predicted detection range of the improved TPL-25 system is calculated to be 4932 yards (4510 meters).

The detection range can be compared between the existing TPL-25 system and improved TPL-25 system. By comparison, the detection range of the improved TPL-25 system is 1913 meters (73.7%) greater than the detection range of the current TPL-25 system.

This improved TPL-25 system embodying the teachings herein is a 0.5 meter (20 inch) linear aperture that utilizes multimode technology to achieve a Directivity Index (DI) of 18.35 dB. The targeted application is the Navy's Towed Pinger Locator 25 (TPL-25) which is the system currently used by the U.S. Navy to search for downed aircraft. It has been shown that this invention (when used in replace of the TPL-25's omnidirectional hydrophone) increases the detection range of the TPL-25 by 73.7%—from 2597 meters to 4510 meters. An increased detection range results in an increased Area Coverage Rate (ACR), which is significant due to the limited battery life of the Underwater Locator Beacon (ULB), the transmitter mounted to an aircraft's flight recorder.

In direct replacement of the prior art, the teachings herein provide a higher detection range, eliminate the forward-aft ambiguity that exists in the prior art, and provides the increased flexibility of orienting the array either parallel or orthogonal to the direction of motion. This provides the significant advantage of allowing positioning of the array onboard an Unmanned Underwater Vehicle (UUV) that may be 21 inches in diameter or smaller. The UUV can be used instead of the TPL-25 to search for ULBs.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive, nor to limit the invention to the precise form disclosed; and obviously, many modifications and variations are possible in light of the above teaching. Such modifications and variations that may be apparent to a person skilled in the art are intended to be included within the scope of this invention as defined by the accompanying claims.

What is claimed is:

1. An acoustic array comprising:
a frame having a proximate end and a distal end;
a plurality of multimode transducers positioned linearly along said frame, said multimode transducers being in the form of a hollow cylinder having at least two circumferential transducer segments, each segment having an electrode associated with the segment and a ground electrode associated with all of the segments of one said multimode transducer;
an elastomeric bushing positioned between each of said plurality of multimode transducers and said frame;
a plurality of electrical leads joined to the electrodes associated with the segments of said multimode transducers and the ground electrode of said multimode transducers;
a proximate plug located at the proximate end of said frame, said proximate plug having an aperture formed therein;
a distal plug located at the distal end of said frame;
at least one connector positioned in the proximate plug aperture and joined to said plurality of electrical leads;
a hose surrounding said frame and sealingly joined to said proximate plug and said distal plug, said combination of said hose, said frame, said proximate plug, said distal plug, and said plurality of multimode transducers defining an interior array volume; and
a dielectric fluid within said interior array volume.

2. The apparatus of claim 1, wherein one of said plurality of electrical leads is joined to the ground electrode of each said multimode transducer, and one of said plurality of electrical leads is joined to each electrode associated with one segment of one said multimode transducer to allow transmission of an independent signal from each segment of said plurality of multimode transducers.

3. The apparatus of claim 1, wherein one of said plurality of electrical leads is joined to the ground electrode of each said multimode transducer, and one of said plurality of electrical leads is joined to electrodes associated with corresponding segments of said plurality of multimode transducers to allow transmission of combined signals from similarly oriented segments of said plurality of multimode transducers.

4. The apparatus of claim 1, wherein said frame comprises:
   a distal rigid cylindrical base at said frame distal end;
   a proximate rigid cylindrical base at said frame proximate end having a base aperture formed therein; and
   a plurality of rigid rods joined at a first end to said distal rigid base and at a second end to said proximate rigid base.

5. The apparatus of claim 4, wherein said plurality of electrical leads extends from the electrodes through the hollow cylinder defined by said multimode transducers through the base aperture of said proximate rigid base through said proximate plug aperture to said at least one connector.

6. The apparatus of claim 5, wherein one of said plurality of electrical leads is joined to the ground electrode of each said multimode transducer, and one of said plurality of electrical leads is joined to each electrode associated with one segment of one said multimode transducer to allow transmission of an independent signal from each segment of said plurality of multimode transducers.

7. The apparatus of claim 5, wherein one of said plurality of electrical leads is joined to the ground electrode of each said multimode transducer, and one of said plurality of electrical leads is joined to electrodes associated with corresponding segments of said plurality of multimode transducers to allow transmission of combined signals from similarly oriented segments of said plurality of multimode transducers.

8. The apparatus of claim 1, wherein:
   said plurality of multimode transducers each have at least four circumferential transducer segments, each segment having an electrode associated with the segment and a ground electrode associated with all of the segments of one said multimode transducer; and
   one of said plurality of electrical leads is joined to the ground electrode of each said multimode transducer, and one of said plurality of electrical leads is joined to each electrode associated with one segment of one said multimode transducer to allow transmission of an independent signal from each segment of said plurality of multimode transducers.

9. The apparatus of claim 8, wherein said electrical leads associated with a single multimode transducer segment are grouped into multiple sets of adjacent segments for analysis.

10. The apparatus of claim 9, wherein at least one set of adjacent segments groups all of the segments together for receiving vibrations in mode 0.

11. The apparatus of claim 10, wherein at least one additional set of adjacent segments groups a first set of two adjacent segments together for receiving vibrations in mode 1 in a first direction.

12. The apparatus of claim 11, wherein at least another additional set of adjacent segments groups a second set of two adjacent segments together for receiving vibrations in mode 1 in a second direction.

* * * * *